United States Patent
Kang et al.

(10) Patent No.: US 9,092,666 B2
(45) Date of Patent: Jul. 28, 2015

(54) METHOD AND APPARATUS FOR ESTIMATING ORGAN DEFORMATION MODEL AND MEDICAL IMAGE SYSTEM

(71) Applicant: Samsung Electronics Co., Ltd., Suwon-si (KR)

(72) Inventors: Na-hyup Kang, Seoul (KR); Tae-hyun Rhee, Yongin (KR); Kyung-hwan Kim, Yongin (KR); Do-kyoon Kim, Seongnam (KR); Sang-wook Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 13/733,333

(22) Filed: Jan. 3, 2013

(65) Prior Publication Data

US 2013/0170725 A1  Jul. 4, 2013

(30) Foreign Application Priority Data

Jan. 3, 2012 (KR) .................. 10-2012-0000644
Nov. 20, 2012 (KR) .................. 10-2012-0131956

(51) Int. Cl.
*G06K 9/00* (2006.01)
*G06T 7/00* (2006.01)
*G06T 19/20* (2011.01)

(52) U.S. Cl.
CPC .......... *G06K 9/00362* (2013.01); *G06T 7/0032* (2013.01); *G06T 19/20* (2013.01); *G06T 2207/10028* (2013.01); *G06T 2207/30004* (2013.01); *G06T 2210/41* (2013.01); *G06T 2219/2021* (2013.01)

(58) Field of Classification Search
CPC .................. G06K 9/00362; G06K 2209/051; G06K 2209/40; G06T 7/0032; G06T 7/2046; G06T 17/00; G06T 19/20; G06T 2207/30004; G06T 2210/41; G06T 2219/2021
See application file for complete search history.

(56) References Cited

U.S. PATENT DOCUMENTS

| | | | |
|---|---|---|---|
| 5,947,899 A | 9/1999 | Winslow et al. | 600/410 |
| 7,239,992 B2 | 7/2007 | Ayache et al. | 703/11 |
| 7,751,984 B2 | 7/2010 | Tang | 702/192 |
| 2008/0193904 A1* | 8/2008 | Santhanam et al. | 434/272 |
| 2008/0262814 A1 | 10/2008 | Zheng et al. | 703/11 |
| 2012/0289825 A1* | 11/2012 | Rai et al. | 600/425 |

FOREIGN PATENT DOCUMENTS

| | | | |
|---|---|---|---|
| JP | 2003-144412 A | 5/2003 | A61B 5/055 |
| KR | 10-2008-0032612 A | 4/2008 | A61B 5/103 |
| KR | 10-0915123 B1 | 9/2009 | A61B 6/00 |
| KR | 10-1059312 B1 | 8/2011 | A61B 8/00 |

* cited by examiner

*Primary Examiner* — Andrew W Johns
(74) *Attorney, Agent, or Firm* — NSIP Law

(57) ABSTRACT

A method of estimating an organ deformation model includes generating at least one 3D organ shape model of an organ of a subject based on at least one non-real time medical image representing a deformation state of the organ of the subject; generating a deformation space for the organ of the subject based on the at least one 3D organ shape model and prior knowledge regarding the organ; and estimating a 3D organ deformation model of the organ of the subject based on a real-time medical image of the organ of the subject and the deformation space.

18 Claims, 4 Drawing Sheets

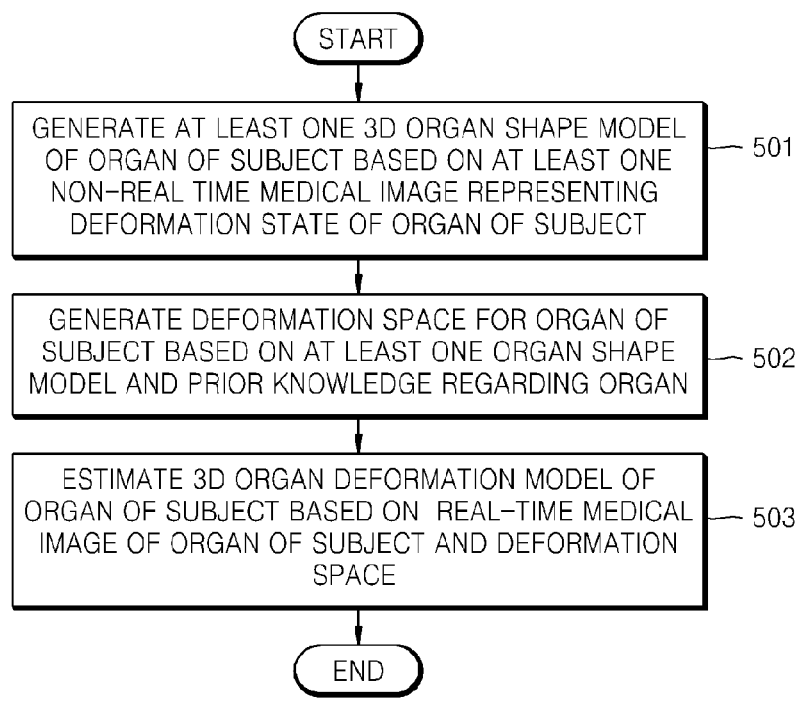

METHOD AND APPARATUS FOR ESTIMATING ORGAN DEFORMATION MODEL AND MEDICAL IMAGE SYSTEM

CROSS-REFERENCE TO RELATED APPLICATIONS

This application claims the benefit of Korean Patent Application Nos. 10-2012-0000644 filed on Jan. 3, 2012, and 10-2012-0131956 filed on Nov. 20, 2012, in the Korean Intellectual Property Office, the disclosures of which are incorporated herein by reference in their entirety for all purposes.

BACKGROUND

1. Field

This application relates to a method and an apparatus for estimating an organ deformation model and a medical image system.

2. Description of Related Art

Human organs are deformed due to continuous contact between organs, respiration, heartbeat, movement of the human body, and other factors applying force to the organs. High-cost and high-resolution medical images may not be provided in real time when trying to determine deformation states of organs. Medical image apparatuses for providing medical images in real time may omit deformation information due to a narrow visualization region.

SUMMARY

In one general aspect, a method of estimating an organ deformation model may include generating at least one 3D organ shape model of an organ of a subject based on at least one non-real time medical image representing a deformation state of the organ of the subject; generating a deformation space for the organ of the subject based on the at least one 3D organ shape model and prior knowledge regarding the organ; and estimating a 3D organ deformation model of the organ of the subject based on a real-time medical image of the organ of the subject and the deformation space.

The generating of the at least one 3D organ shape model may include generating at least two 3D organ shape models all having a same topology.

Connections between vertexes constituting the at least two 3D organ shape models all having the same topology and edges connecting the vertexes may be the same in each of the at least two 3D organ shape models all having the same topology.

The generating of the deformation space may include generating the deformation space by performing an interpolation operation on a deformation space defined based on the at least one 3D organ shape model using the prior knowledge as a limitation condition.

The estimating of the 3D organ deformation model may include estimating the 3D organ deformation model of the organ of the subject by matching the real-time medical image of the organ of the subject to the deformation space.

The method may further include extracting at least one feature point from the real-time medical image of the organ of the subject; and the estimating of the 3D organ deformation model may include estimating the 3D organ deformation model based on the at least one feature point and the deformation space.

The estimating of the 3D organ deformation model may further include detecting a 3D organ shape model satisfying the at least one feature point from the deformation space; and applying the at least one feature point to the detected 3D organ shape model to estimate the 3D organ deformation model.

The method may further include extracting at least one feature point from the real-time medical image of the organ of the subject; and generating a neutral model of the real-time medical image by matching the at least one feature point to one 3D organ shape model of the at least one 3D organ shape model; and the estimating of the 3D organ deformation model may include estimating the 3D organ deformation model based on the neutral model and the deformation space.

The generating of the neutral model may include detecting at least one point corresponding to the at least one feature point in the one 3D shape model of the at least one 3D organ shape model; and deforming the detected at least one point based on the at least one feature point to generate the neutral model.

The estimating of the 3D organ deformation model may further include projecting the neutral model onto the deformation space to estimate the 3D organ deformation model.

In another general aspect, a non-transitory computer-readable storage medium stores a program for controlling a computer to perform the method described above.

In another general aspect, an apparatus for estimating an organ deformation model includes a 3D organ shape model generation unit configured to generate at least one 3D organ shape model of an organ of a subject based on at least one non-real time medical image representing a deformation state of the organ of the subject; a deformation space generation unit configured to generate a deformation space for the organ of the subject based on the at least one 3D organ shape model and prior knowledge regarding the organ; and a 3D organ deformation model estimation unit configured to estimate a 3D organ deformation model of the organ of the subject based on a real-time medical image of the organ of the subject and the deformation space.

The 3D organ shape model generation unit may be further configured to generate at least two 3D organ shape models all having a same topology.

The deformation space generation unit may be further configured to generate the deformation space by performing an interpolation operation on a deformation space defined based on the at least one 3D organ shape model using the prior knowledge as a limitation condition.

The 3D organ deformation model estimation unit may be further configured to estimate the 3D organ deformation model of the organ of the subject by matching the real-time medical image of the organ of the subject to the deformation space.

The apparatus may further include a feature point extraction unit configured to extract at least one feature point from the real-time medical image of the organ of the subject; and the 3D organ deformation model estimation unit may be further configured to estimate the 3D organ deformation model based on the at least one feature point and the deformation space.

The apparatus may further include a feature point extraction unit configured to extract at least one feature point from the real-time medical image of the organ of the subject; and a neutral model generation unit configured to generate a neutral model of the real-time medical image by matching the at least one feature point to one 3D organ shape model of the at least one 3D organ shape model; and the 3D organ deformation model estimation unit may be further configured to estimate the 3D organ deformation model based on the neutral model and the deformation space.

The 3D organ deformation model estimation unit may be further configured to project the neutral model onto the deformation space to estimate the 3D organ deformation model.

In another general aspect, a medical image system includes a real-time medical image generation apparatus configured to generate a real-time medical image of an organ of a subject; an organ deformation model estimation apparatus configured to estimate a 3D organ deformation model of the real-time medical image of the subject based on at least one 3D organ deformation model representing a deformation state of the organ of the subject and a deformation space generated based on prior knowledge regarding the organ; and a display unit configured to display the estimated 3D organ deformation model.

The real-time medical image generation apparatus may be further configured to generate an ultrasonic image.

In another general aspect, a method of estimating an organ deformation model includes generating a deformation space representing a plurality of deformation states of an organ of a subject based on a plurality of medical images of the organ of the subject; and estimating a 3D organ deformation model of the organ of the subject based on the deformation space and an additional medical image of the organ of the subject.

The plurality of medical images may have a higher resolution than the additional medical image.

The plurality of medical images may be a first type of medical image; and the additional medical image may be a second type of medical image different from the first type of medical image.

The plurality of medical images may be non-real time medical images; the additional medical image of the subject may be a real-time medical image of the subject acquired as the subject is being examined; and the estimating of the 3D organ deformation model may be performed as the subject is being examined.

The generating of the deformation space may include generating a plurality of 3D organ shape models representing a plurality of deformation states of the organ of the subject from the plurality of medical images; and generating the deformation space based on the plurality of 3D organ shape models and prior knowledge regarding the organ of the subject.

A number of the plurality of deformation states represented by the deformation space may be greater than a number of the plurality of deformation states represented by the plurality of 3D organ shape models.

The prior knowledge may include at least one limitation condition for the deformation space; and the generating of the deformation space based on the plurality of 3D organ shape models and the prior knowledge regarding the organ of the subject may include projecting the plurality of 3D organ shape models onto a space to generate projection data of the deformation space, the projection data corresponding to the plurality of deformation states represented by the plurality of 3D organ shape models; and interpolating the projection data subject to the at least one limitation condition to generate interpolation data of the deformation space, the interpolation data corresponding to a plurality of deformation states intermediate to the plurality of deformation states represented by the plurality of 3D organ shape models.

The estimating of the 3D organ deformation model may include matching the additional medical image to the deformation space; and estimating the 3D organ deformation model based on a result of the matching.

The estimating of the 3D organ deformation space may include extracting at least one feature point from the additional medical image; detecting at least one point of one 3D organ shape model of the plurality of 3D organ shape models corresponding to the at least one feature point; generating a neutral model by deforming the at least one point of the one 3D organ shape model based on the at least one feature point, thereby deforming the one 3D organ shape model to generate the neutral model; matching the neutral model to the deformation space; and estimating the 3D organ deformation model based on a result of the matching.

Other features and aspects will be apparent from the following detailed description, the drawings, and the claims.

BRIEF DESCRIPTION OF THE DRAWINGS

FIG. 5 is a flowchart illustrating an example of a method of estimating an organ deformation model.

DETAILED DESCRIPTION

Figure 1:
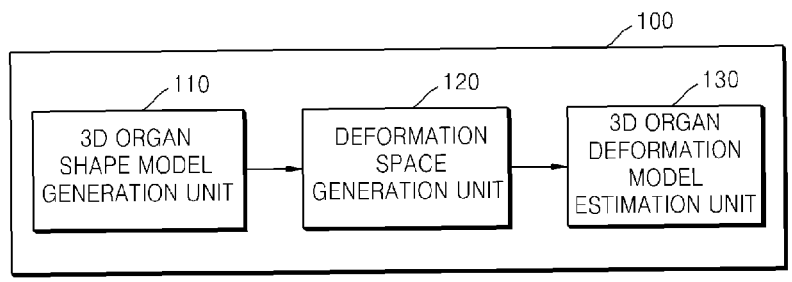
FIG. 1 is a block diagram illustrating an example of an organ deformation model estimation apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 is a block diagram illustrating an example of an organ deformation model estimation apparatus 100. Referring to FIG. 1, the organ deformation model estimation apparatus 100 includes a 3D organ shape model generation unit 110, a deformation space generation unit 120, and a 3D organ deformation model estimation unit 130.

Only elements related to this example are shown in the organ deformation model estimation apparatus 100 of FIG. 1. Accordingly, it will be apparent to one of ordinary skill in the art that other general-purpose elements may also be included in the organ deformation model estimation apparatus 100. Furthermore, the organ deformation model estimation apparatus 100 of FIG. 1 may be implemented by one or more processors.

The organ deformation model estimation apparatus 100 estimates a 3D organ deformation model of an organ of a subject. The organ of the subject may include all organs of a human body having deformable shapes due to at least one of respiration of the subject, a heartbeat thereof, a posture thereof, and movement thereof. For example, the organ of the subject may include a heart, a liver, a lung, a pancreas, a kidney, and other organs, but is not limited thereto. The subject may be a patient but is not limited thereto.

The organ of the subject has a non-rigid characteristic, and thus a shape or a size of the organ may be deformed due to respiration of the subject, the heartbeat thereof, the posture thereof, or the movement thereof, and due to contact between organs. Accordingly, the organ deformation model estimation apparatus 100 accurately estimates an organ deformation model reflecting an organ deformation state of the subject based on a non-real time medical image of the organ of the subject.

The organ deformation model estimation apparatus 100 may also estimate a 3D organ deformation model of a real-time medical image acquired from the organ of the subject through real-time processing based on a deformation space for the organ of the subject previously generated through pre-processing.

Accordingly, the 3D organ deformation model generation unit 110 and the deformation space generation unit 120 of the organ deformation model estimation apparatus 100 may be used in the pre-processing, and the 3D organ deformation model estimation unit 130 thereof may be used in the real-time processing. For example, the pre-processing may be performed before surgery is performed on the subject, and the real-time processing may be performed during the surgery, but this example is not limited thereto.

Therefore, the organ deformation model estimation apparatus 100 may quickly and accurately estimate a 3D organ deformation model reflecting the deformation state of the organ of the subject in real time, such as during the surgery being performed on the subject.

The 3D organ shape model generation unit 110 generates at least one 3D organ shape model of the organ of the subject based on at least one non-real time medical image representing the deformation state of the organ of the subject. The non-real time medical image may be a high resolution 3D medical image. For example, the non-real time medical image may be a computed tomography (CT) image or a magnetic resonance imaging (MRI) image, but is not limited thereto.

Regarding the deformation state of the organ of the subject, for example, a size or a shape of the organ of the subject may vary due to respiration of the subject, the heartbeat thereof, the posture thereof, or the movement thereof, and due to contact between organs. In this case, the respiration of the subject may include both inhalation and exhalation.

The 3D organ shape model generation unit 110 acquires the at least one non-real time medical image representing the deformation state of the organ of the subject in order to generate the 3D organ shape model of the organ of the subject.

In one example, the 3D organ shape model and the non-real time medical image represent the same organ of the same subject. For example, the 3D organ shape model generation unit 110 generates at least one 3D organ shape model of a heart of a first subject based on at least one non-real time medical image representing a deformation state of the heart of the first subject.

The at least one non-real time medical image representing the deformation state of the heart may include both a non-real time medical image of a contraction stage of the heart and a non-real time medical image of a relaxation stage of the heart, but is not limited thereto. The at least one non-real time medical image representing the deformation state of the heart may include the non-real time medical image of the contraction stage of the heart or the non-real time medical image of the relaxation stage of the heart, or may further include non-real time medical images representing various states of the heart in addition to the non-real time medical images of the contraction stage and the relaxation stage of the heart.

In another example, the 3D organ shape model generation unit 110 generates the at least one 3D organ shape model of the heart of the first subject based on at least one non-real time medical image representing a deformation state of a heart of a second subject different from the first subject.

The 3D organ shape model generation unit 110 acquires the at least one non-real time medical image representing the deformation state of the organ of the subject. The at least one non-real time medical image acquired by the 3D organ shape model generation unit 110 may be 3D volume data indicating the organ of the subject, but is not limited thereto. The 3D volume data may be acquired by accumulating a plurality of 2D images.

As such, the 3D organ shape model generation unit 110 generates the at least one 3D organ shape model of the organ of the subject based on at least one piece of 3D volume data indicating the deformation state of the organ of the subject. For example, the 3D organ shape model may be data indicating a 3D model of a shape of the organ corresponding to the 3D volume data, but is not limited thereto.

The 3D organ shape model generation unit 110 may generate the 3D organ shape model by acquiring coordinate information regarding a boundary of the organ and coordinate information of an internal structure thereof from the 3D volume data indicating the organ of the subject.

The boundary of the organ is a point of the 3D volume data at which brightness rapidly changes, and thus the 3D organ shape model generation unit 110 may acquire a coordinate of a point having the greatest frequency value as the coordinate information regarding the boundary of the organ using a discrete-time Fourier transform (DTFT) algorithm or any other suitable algorithm known to one of ordinary skill in the art, or may acquire the coordinate information by receiving information regarding the boundary of the organ from a user of the organ deformation model estimation apparatus 100.

The coordinate information of the internal structure of the organ may be acquired by adding a coordinate (for example, a coordinate in an axis z) with respect to a direction in which 2D images are accumulated to generate the 3D volume data to a 2D coordinate (for example, coordinate information regarding axes x and y) extracted from 2D images included in the 3D volume data.

The 3D organ shape model generation unit 110 generates 3D organ shape models having the same topology for a particular organ. The same topology means that connection relations between vertexes constituting the 3D organ shape models and edges connecting the vertexes are the same in all of the 3D organ models for the particular organ. Accordingly, correspondences between the 3D organ shape models generated by the 3D organ shape model generation unit 110 for a particular organ may be determined quickly and efficiently. However, 3D organ shape models for different organs may have different topologies. For example, a 3D organ shape model for a heart may have a different topology than a 3D organ shape model for a liver.

For example, if a first 3D organ shape model generated by the 3D organ shape model generation unit 110 includes first through fifth vertexes, and the first and second vertexes are connected via a first edge, a second 3D organ shape model includes the first through fifth vertexes, and the first and second vertexes of the second 3D organ shape model are connected via the first edge. In this case, the first through fifth vertexes constituting the first 3D organ shape model may have different positions. That is, the first vertex constituting the first 3D organ shape model may have a coordinate different from that of the first vertex constituting the second 3D organ shape model, and the second vertex constituting the first 3D organ shape model may have a coordinate different from that of the second vertex constituting the second 3D organ shape model. Similarly, the third through fifth vertexes may have different coordinates in the first 3D organ shape model and the second 3D organ shape model. Therefore, the first 3D organ shape model and the second 3D organ shape model may represent different deformation states of the same organ.

The deformation space generation unit 120 generates a deformation space for the organ of the subject based on the at least one organ shape model generated by the 3D organ shape model generation unit 110 and prior knowledge regarding the organ. The deformation space may be a data based physical space defined by the deformation space generation unit 120, but is not limited thereto.

For example, the prior knowledge regarding the organ may be knowledge that the user of the organ deformation model estimation apparatus 100 already has regarding an organ, or may be knowledge accumulated and summarized regarding characteristics of the organ. In more detail, the prior knowledge regarding the organ may include characteristics of the organ, such as a volume of a liver remains unchanged even if the liver is deformed, i.e., that the liver has an isochoric characteristic, some organs like bones are rigid and thus are hardly deformed, and other characteristics of the organ. As such, the prior knowledge regarding the organ may include previously known information regarding various organs.

Accordingly, the deformation space generation unit 120 sets the prior knowledge as a limitation condition for the deformation space, and thus accuracy of the deformation space for the organ of the subject may be enhanced.

In more detail, the deformation space for the organ of the subject may be generated by performing an interpolation operation on a deformation space defined based on at least one organ shape model using the prior knowledge as the limitation condition.

The deformation space generation unit 120 may define the deformation space for the organ of the subject by projecting 3D organ shape models generated by the 3D organ shape model generation unit 110 onto a previously defined data based physical space. For example, a previously defined data based physical space is previously prepared for each of various organs. Every point of the previously defined data based physical space is empty when the previously defined data based physical space is created, and is then filled with data by projecting a respective one of the 3D organ shape models onto the previously defined data based physical space. Thus, points of the deformation space generated by the deformation space generation unit 120 correspond to projection data of the 3D organ shape models.

As such, the deformation space generated by the deformation space generation unit 120 may include projection data onto which the 3D organ shape models generated by the 3D organ shape model generation unit 110 are projected, but is not limited thereto. The deformation space may further include interpolation data obtained by performing the interpolation operation on the projection data.

For example, the deformation space generation unit 120 may generate the deformation space by minimizing an error using a least-squares optimization method and performing a projection operation on a previously defined deformation space, but is not limited thereto. That is, the deformation space generation unit 120 may prevent errors from concentrating in a region by spreading errors over a global region using the least-squares optimization method, thereby enhancing an overall precision of the deformation space.

Furthermore, the deformation space generation unit 120 may generate the deformation space by performing the interpolation operation on a result of the projection operation using the prior knowledge as the limitation condition. For example, if the deformation space includes first projection data obtained by projecting the first 3D organ shape model and second projection data obtained by projecting the second 3D organ shape model, the deformation space generation unit 120 may perform the interpolation operation on the first projection data and the second projection data.

The deformation space generation unit 120 may use the prior knowledge as the limitation condition when performing the interpolation operation on the first projection data and the second projection data. In more detail, for example, if the organ of the subject is the liver, and the prior knowledge regarding the liver is that that a volume of the liver remains unchanged even if the liver is deformed, third interpolation data generated by performing the interpolation operation on the first projection data and the second projection data has a limitation condition that the first projection data and the second projection data have the same volume. Furthermore, the deformation space generation unit 120 may perform the interpolation operation on the result of the projection operation based on the prior knowledge that organs like bones are hardly deformed since they are rigid.

As described above, the deformation space generated by the deformation space generation unit 120 may include at least one piece of projection data obtained by performing the projection operation and at least one piece of interpolation data obtained by performing the interpolation operation, and uses the prior knowledge as the limitation condition when generating the interpolation data. Both the projection data and the interpolation data may be expressed using rotation and translation. In other words, a plurality of data (i.e., projection data and interpolation data) existing in the deformation space may be defined by applying a rotation operation and/or a translation operation to each other. For example, if first projection data and second projection data exist in the same deformation space, the second projection data may defined by applying a rotation operation and/or a translation operation to the first projection data.

Furthermore, the deformation space generation unit 120 is not limited to the limitation conditions described above, but may further use a governing equation of continuum mechanics as the limitation condition based on characteristics such as isometric, isochoric, and any other characteristics known to one of ordinary skill in the art, or physical information such as elasticity of the organ, density thereof, and any other physical information of the organ As described above, deformation states resulting from a deformation of the organ of the subject exist in the deformation space generated by the deformation space generation unit 120. As such, the results of deforming the organ exist in the deformation space, i.e., the data based physical space, and thus an accurate deformation model of the organ of the subject may be estimated.

Furthermore, the deformation space generation unit 120 generates the deformation space by combining a geometrical deformation difference between the 3D organ shape models and the prior knowledge regarding the organ, and thus a deformation space personalized for the organ of the subject is generated, thereby enhancing accuracy of the deformation space.

Furthermore, the deformation space generation unit 120 generates the deformation space for the organ based on a plurality of 3D organ shape models and prior knowledge regarding the organ. For example, the deformation space generation unit 120 selects any one 3D organ shape model from the plurality of 3D organ shape models generated by the 3D organ shape model generation unit as a base model, computes deformation matrices between the base model and the remaining ones of the plurality of 3D organ shape models, and performs polar decomposition of the deformation matrices. For example, F=RS denotes the polar decomposition of a deformation matrix F, where R denotes a unitary matrix, S denotes a positive-semidefinite matrix, and R and F are separately and independently interpolated. The deformation matrix F is defined by pairs of R and S obtained by applying the prior knowledge regarding the organ. For example, if the prior knowledge regarding the organ is that the organ has an isochoric characteristic, i.e., the volume of the organ remains unchanged even if the organ is deformed, the deformation space generation unit 120 constrains det(F)=1 to define the deformation space. In this regard, the deformation space generation unit 120 sets the prior knowledge regarding the organ as a limitation condition for the deformation space. Thus, the deformation space generation unit 120 generates the deformation space of the organ. The generated deformation space may be a non-linear space.

The 3D organ deformation model estimation unit 130 estimates the 3D organ deformation model of the organ of the subject based on the real-time medical image of the organ of the subject and the deformation space generated by the deformation space generation unit 120. The real-time medical image may be a medical image having low cost, low resolution, and a narrow visible region. For example, the real-time medical image may be a 2D ultrasonic image, a 3D ultrasonic image, 3D ultrasonic volume data, or any other type of ultrasonic image or data known to one of ordinary skill in the art, but is not limited thereto.

The real-time medical image acquired by the 3D organ deformation model estimation unit 130 quickly shows an instant status change so as to monitor a treatment process in real time, whereas the non-real time medical image has a higher resolution than the real-time medical image. Therefore, the 3D organ deformation model estimation unit 130 may estimate the 3D organ deformation model of the organ of the subject by matching the real-time medical image of the organ of the subject to the deformation space.

For example, the 3D organ deformation model estimation unit 130 matches the real-time medical image to the deformation space, and if the deformation space includes a point corresponding to the real-time medical image, the 3D organ deformation model estimation unit 130 estimates data corresponding to the corresponding point as the 3D organ deformation model.

As another example, the 3D organ deformation model estimation unit 130 matches the real-time medical image to the deformation space, and if the deformation space does not include a point corresponding to the real-time medical image, estimates data corresponding to points neighboring a location in the deformation space where the corresponding point would be if the corresponding point existed as the 3D organ deformation model. That is, since neighboring points in the deformation space have great similarity, if the deformation space does not include a point corresponding to the real-time medical image, the 3D organ deformation model estimation unit 130 estimates data corresponding to points neighboring a location in the deformation space where the corresponding point would be if the corresponding point existed as the 3D organ deformation model.

The data corresponding to points neighboring the location in the deformation space where the corresponding point would be if the corresponding point existed may be generated by performing the interpolation operation on points already existing in the deformation space using the prior knowledge as the limitation condition. The interpolation operation may be performed by the deformation space generation unit 120, but is not limited thereto, and may be performed by the 3D organ deformation model estimation unit 130.

Accordingly, the organ deformation model estimation apparatus 100 may quickly and accurately estimate the 3D organ deformation model of the organ of the subject based on the real-time medical image of the organ of the subject. Thus, the organ deformation model estimation apparatus 100 may estimate the 3D organ deformation model of the organ of the subject, and provide a user of the organ deformation model estimation apparatus 100 with the estimated 3D organ deformation model in real time.

Figure 2:
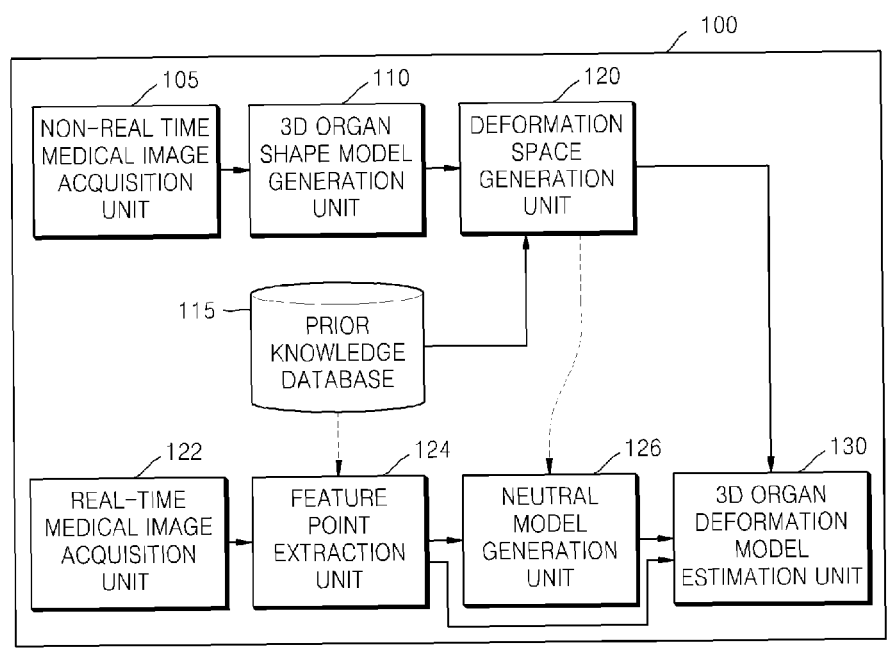
FIG. 2 is a block diagram illustrating an example of the organ deformation model estimation apparatus of FIG. 1.

FIG. 2 is a block diagram illustrating an example of the organ deformation model estimation apparatus 100 of FIG. 1. Referring to FIG. 2, the organ deformation model estimation apparatus 100 includes a non-real time medical image acquisition unit 105, the 3D organ shape model generation unit 110, a prior knowledge database 115, the deformation space generation unit 120, a real-time medical image acquisition unit 122, a feature point extraction unit 124, a neutral model generation unit 126, and the 3D organ deformation model estimation unit 130.

Only elements related to this example are shown in the organ deformation model estimation apparatus 100 of FIG. 2. Accordingly, it will be apparent to one of ordinary skill in the art that other general-purpose elements may also be included in the organ deformation model estimation apparatus 100.

Furthermore, the organ deformation model estimation apparatus 100 of FIG. 2 corresponds to the organ deformation model estimation apparatus 100 of FIG. 1. Accordingly, the description with reference to FIG. 1 is also applicable to the organ deformation model estimation apparatus 100 of FIG. 2, and thus redundant descriptions will not be repeated below.

As described with reference to FIG. 1, the organ deformation model estimation apparatus 100 may estimate a 3D organ deformation model of a real-time medical image acquired from an organ of a subject through real-time processing based on a previously generated deformation space for the organ of the subject generated through pre-processing.

Accordingly, the non-real time medical image acquisition unit 105, the 3D organ shape model generation unit 110, the prior knowledge database 115, and the deformation space generation unit 120 of the organ deformation model estimation apparatus 100 may be used in the pre-processing, and the prior knowledge database 115, the real-time medical image acquisition unit 122, the feature point extraction unit 124, the neutral model generation unit 126, and the 3D organ deformation model estimation unit 130 thereof may be used in the real-time processing.

The non-real time medical image acquisition unit 105 acquires at least one non-real time medical image representing a deformation state of the organ of the subject. The non-real time medical image acquisition unit 105 may acquire at least one non-real time medical image generated from a non-real time medical image generation unit (not shown), but is not limited thereto, and may acquire a non-real time medical image that has previously been measured and stored.

The 3D organ shape model generation unit 110 generates at least one 3D organ shape model of the organ of the subject based on the at least one non-real time medical image acquired by the non-real time medical image acquisition unit 105.

The prior knowledge database 115 stores information that the user already knew or information that has been accumulated and summarized regarding characteristics of the organ. For example, the prior knowledge database 115 may store previously known information regarding various organs as a database. Accordingly, the prior knowledge database 115 stores information regarding physical characteristics of various organs, information regarding deformation states thereof, and any other information regarding various organs. Furthermore, the prior knowledge database 115 is not limited thereto, and may include various other pieces of information regarding characteristic of organs.

Accordingly, the organ deformation model estimation apparatus 100 estimates an accurate organ deformation model of the organ of the subject based on characteristics of various organs previously stored in the prior knowledge database 115.

The deformation space generation unit 120 generates a deformation space for the organ of the subject based on the at least one organ shape model generated by the 3D organ shape model generation unit 110 and the prior knowledge regarding the organ stored in the prior knowledge database 115.

The deformation space generation unit 120 may extract the prior knowledge regarding the organ corresponding to at least one organ shape model from the prior knowledge regarding the organ stored in the prior knowledge database 115 based on the at least one organ shape model generated by the 3D organ shape model generation unit 110, and generate the deformation space for the organ of the subject based on the extracted prior knowledge.

An example of a process of generating a deformation space for a liver in the deformation space generation unit 120 will now be described below. The prior knowledge database 115 includes a characteristic that a volume of the liver is preserved, and a continuum mechanics based physical deformation governing equation based on elasticity measured using elastography or any other method known to one of ordinary skill in the art for measuring elasticity. Accordingly, the deformation space generation unit 120 generates the deformation space by setting conservation of the volume and the governing equation as limitation conditions.

For example, a law of conservation of momentum in continuum mechanics may be defined according to Equation 1 below.

$$\rho \ddot{u} = \nabla \cdot \sigma \qquad (1)$$

In equation 1, $\rho$ denotes a density of the liver, u denotes a displacement of the liver, and $\sigma$ denotes a stress (Newton/$m^2$) of the liver.

Furthermore, the stress $\sigma$ of the liver may be defined according to Equation 2 below.

$$\sigma = E \cdot \epsilon(u) \qquad (2)$$

In equation 2, E denotes an elasticity of the liver, and $\epsilon$ denotes a shape deformation rate of the liver.

Accordingly, the limitation condition of the volume conservation may be defined according to Equation 3 below.

$$\nabla \cdot u = 0 \qquad (3)$$

The deformation space generation unit 120 may generate the deformation space satisfying the limitation condition through the organ shape model personalized to the subject and the prior knowledge by setting a law of conservation of momentum in continuum mechanics as defined in Equations 1 and 2 and a volume conservation equation as defined in Equation 3 as the limitation conditions.

Accordingly, the organ deformation model estimation apparatus 100 may perform the pre-processing using the non-real time medical image acquisition unit 105, the 3D organ shape model generation unit 110, the prior knowledge database 115, and the deformation space generation unit 120.

The real-time medical image acquisition unit 122 acquires a real-time medical image of the organ of the subject. The real-time medical image acquisition unit 122 may acquire the real-time medical image generated from a real-time medical image generation unit (not shown), but is not limited thereto.

The feature point extraction unit 124 extracts at least one feature point from the real-time medical image of the organ of the subject. The at least one feature point may be a point indicating a feature of the organ, or a point affected by deformation of the organ, or a point that moves when the organ is deformed, or any other point of the organ that has some significance, and may be a single pixel or voxel of the real-time medical image. Furthermore, the feature point extraction unit 124 may extract information regarding the at least one feature point from the prior knowledge database 115, and extract the at least one feature point from the real-time medical image based on the extracted information.

The 3D organ deformation model estimation unit 130 estimates a 3D organ deformation model of the organ of the subject based on the feature point extracted by the feature point extraction unit 124 and the deformation space generated by the deformation space generation unit 120.

In a case where the feature point extracted by the feature point extraction unit 124 has a reliable precision, the 3D organ deformation model estimation unit 130 detects a 3D organ shape model satisfying the feature point from the deformation space. A case where the feature point extracted by the feature point extraction unit 124 has a reliable precision is, for example, a case where information regarding the feature point acquired from the prior knowledge database 115 is accurate, or a case where the number of feature points is sufficient, but is not limited thereto.

For example, the 3D organ deformation model estimation unit 130 may detect points corresponding to the feature point from 3D organ shape models included in the deformation space, and detect the 3D organ shape model including a point most similar to the feature point from the detected points as the 3D organ shape model satisfying the feature point.

In more detail, for example, if the feature point extraction unit 124 detects a first feature point and a second feature point, the 3D organ deformation model estimation unit 130 detects points corresponding to the first feature point and the second feature point from the respective 3D organ shape models included in the deformation space. The points corresponding to the first feature point and the second feature point may be voxels of the respective 3D organ shape models. The 3D organ deformation model estimation unit 130 detects the 3D organ shape model including points most similar to the first feature point and the second feature point from the points detected from the respective 3D organ shape models included in the deformation space as the 3D organ shape model satisfying the feature point. The points most similar to the first feature point and the second feature point may be points having location relations most similar to those of the first feature point and the second feature point, or points having correlations most similar to those of the first feature point and the second feature point, but are not limited thereto.

The 3D organ deformation model estimation unit 130 estimates the 3D organ deformation model of the organ of the subject by applying the feature point to the 3D organ shape model satisfying the feature point among the 3D organ shape models included in the deformation space. An example of applying the feature point to the 3D organ shape model satisfying the feature point is deforming location relations of the points corresponding to the first feature point and the second feature point among points constituting the 3D organ shape model satisfying the feature point to be the same as the first feature point and the second feature point, but the applying is not limited thereto.

For example, an example of applying the first feature point and the second feature point to the 3D organ shape model satisfying the feature point is deforming location relations of a third point and a fourth point corresponding to the first feature point and the second feature point among points constituting the most similar 3D organ shape model satisfying the feature point to be the same as the first feature point and the second feature point, but the applying is not limited thereto. All points constituting the most similar 3D organ shape model may be deformed to be similar to the real-time medical image by deforming the location relations of the third point and the fourth point.

Accordingly, the 3D organ deformation model estimation unit 130 may quickly and accurately estimate the 3D organ deformation model of the organ of the subject by applying the feature point to the 3D organ shape model satisfying the feature point among the 3D organ shape models included in the deformation space.

In a case where the feature point extracted by the feature point extraction unit 124 has a reliable precision as described above, the neutral model generation unit 126 of FIG. 2 need not operate. However, in a case where the feature point extracted by the feature point extraction unit 124 does not have a reliable precision, the neutral model generation unit 126 operates. A case where the feature point extracted by the feature point extraction unit 124 does not have a reliable precision is, for example, a case where the number of feature points is insufficient, or a case where the feature point has noise, but is not limited thereto.

The neutral model generation unit 126 generates a neutral model of the real-time medical image by matching the feature point extracted by the feature point extraction unit 124 to a 3D organ shape model of the organ of the subject. The 3D organ shape model of the organ of the subject may be one of the at least one 3D organ shape model generated by the 3D organ shape model generation unit 110.

In more detail, since the at least one 3D organ shape model generated by the 3D organ shape model generation unit 110 for a particular organ all have the same topology, the neutral model generation unit 126 may select and use any 3D organ shape model of the at least one 3D organ shape model of the organ of the subject generated by the 3D organ shape model generation unit 110. For example, the neutral model generation unit 126 may generate the neutral model by matching at least one feature point extracted by the feature point extraction unit 124 to the selected 3D organ shape model of the organ of the subject.

In more detail, the neutral model generation unit 126 detects at least one point corresponding to the at least one feature point extracted by the feature point extraction unit 124 from the 3D organ shape model of the organ of the subject, and deforms the at least one point detected from the 3D organ shape model of the organ of the subject based on the at least one feature point extracted by the feature point extraction unit 124.

For example, in a case where the feature point extraction unit 124 extracts the first feature point and the second feature point, the neutral model generation unit 126 generates the neutral model by detecting a third point and a fourth point corresponding to the first feature point and the second feature point from the 3D organ shape model of the organ of the subject, and deforming location relations of the third point and fourth point to location relations of the first feature point and the second feature point. All points constituting the neutral model may be deformed to be similar to the real-time medical image by deforming the location relations of the third point and the fourth point.

The 3D organ deformation model estimation unit 130 estimates the 3D organ deformation model of the organ of the subject based on the neutral model generated by the neutral model generation unit 126 and the deformation space generated by the deformation space generation unit 120.

The neutral model generated by the neutral model generation unit 126 and the 3D organ shape models included in the deformation space generated by the deformation space generation unit 120 have the same topology for a particular organ, and thus correspondences therebetween may be easily recognized. Therefore, the 3D organ deformation model estimation unit 130 may estimate the same or the most similar 3D organ shape model as the 3D organ deformation model of the organ of the subject based on correspondences between the neutral model generated by the neutral model generation unit 126 and the 3D organ shape models included in the deformation space generated by the deformation space generation unit 120.

In more detail, the 3D organ deformation model estimation unit 130 may estimate the 3D organ deformation model of the organ of the subject by projecting the neutral model onto the deformation space. That is, the 3D organ deformation model estimation unit 130 detects a point corresponding to the neutral model in the deformation space by projecting the neutral model onto the deformation space, and estimates a 3D organ shape model corresponding to the corresponding point as the 3D organ deformation model of the organ of the subject. For example, the 3D organ deformation model estimation unit 130 projects the neutral model onto the deformation space, and if the deformation space includes a point corresponding to the neutral model, estimates data corresponding to the corresponding point as the 3D organ deformation model of the organ of the subject.

As another example, the 3D organ deformation model estimation unit 130 projects the neutral model onto the deformation space, and if the deformation space does not include a point corresponding to the neutral model, estimates data corresponding to points neighboring a location in the deformation space where the corresponding point would be if the corresponding point existed as the 3D organ deformation model of the organ of the subject. The data corresponding to the points neighboring the location in the deformation space where the corresponding point would be if the corresponding point existed may be generated by performing an interpolation operation that uses prior knowledge as a limitation condition on points already existing in the deformation space. The interpolation operation may be performed by the deformation space generation unit 120 but is not limited thereto, and may be performed by the 3D organ deformation model estimation unit 130.

Accordingly, the organ deformation model estimation apparatus 100 may quickly and accurately estimate the 3D organ deformation model of the organ of the subject based on the neutral model of the organ of the subject. Furthermore, in the cases where the number of feature points is small or the feature point has noise, the organ deformation model estimation apparatus 100 may estimate the 3D organ deformation model based on the deformation space.

As described above, the organ deformation model estimation apparatus 100 may perform the real-time processing using the prior knowledge database 115, the real-time medical image acquisition unit 122, the feature point extraction unit 124, the neutral model generation unit 126, and the 3D organ deformation model estimation unit 130.

Therefore, the organ deformation model estimation apparatus 100 may perform pre-processing to generate a deformation space personalized to the organ of the subject from a non-real time medical image having a high resolution, and if a real-time medical image having a low resolution is input, the organ deformation model estimation apparatus 100 may perform real-time processing to generate a 3D organ deformation model corresponding to a real-time medical image acquired for the organ of the subject based on the deformation space generated by performing pre-processing.

Figure 3:
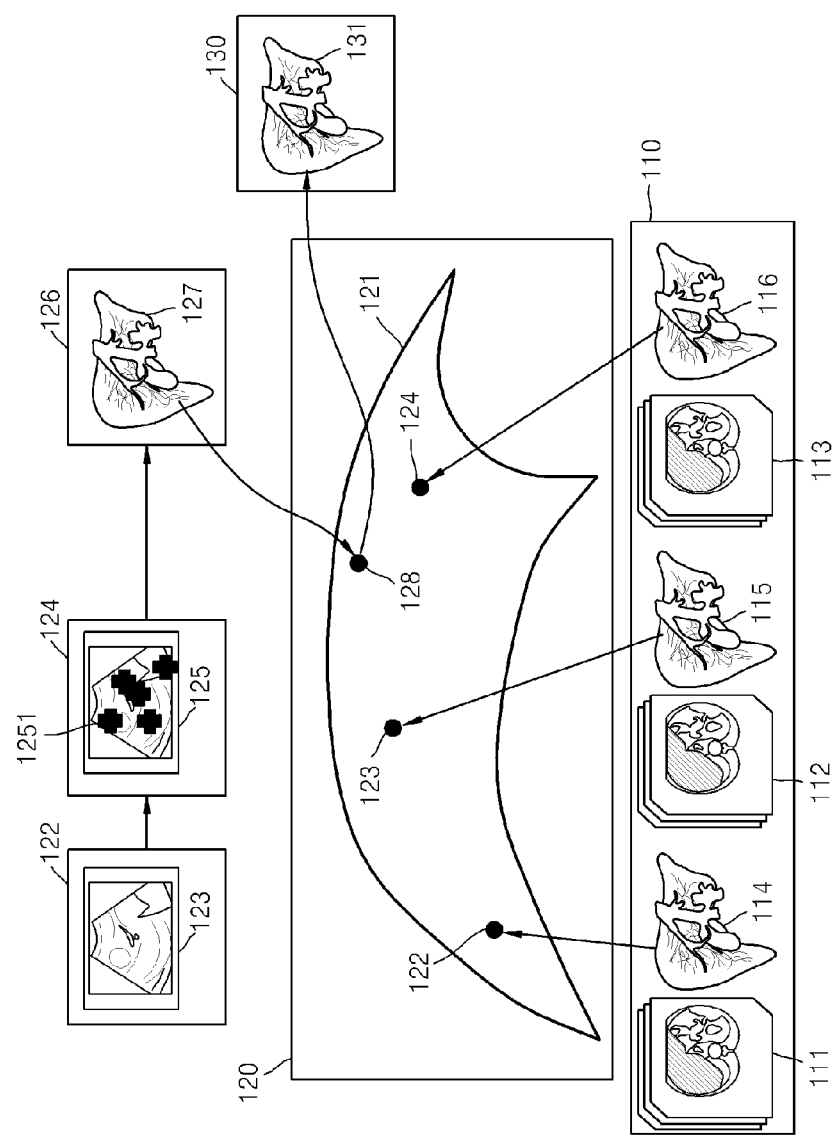
FIG. 3 is a diagram for explaining an example of a process of generating a 3D organ deformation model.

FIG. 3 is a diagram for explaining an example of a process of generating a 3D organ deformation model. Referring to FIGS. 1 through 3, the 3D organ shape model generation unit 110 generates at least one 3D organ shape model of an organ of a subject based on a non-real time medical image representing a deformation state of the organ of the subject. For example, the 3D organ shape model generation unit 110 generates a first 3D organ shape model 114 based on a first non-real time medical image 111, generates a second 3D organ shape model 115 based on a second non-real time medical image 112, and generates a third 3D organ shape model 116 based on a third non-real time medical image 113.

The first through third non-real time medical image 111 through 113 represent deformation states of the organ of the subject. The first through third non-real time medical image 111 through 113 may be 3D medical images.

The deformation space generation unit 120 generates a deformation space 121 for the organ of the subject based on at least one organ shape model and prior knowledge regarding the organ. For example, the deformation space 121 generated by the deformation space generation unit 120 includes first projection data 122 corresponding to the first 3D organ shape model 114, second projection data 123 corresponding to the second 3D organ shape model 115, and third projection data 124 corresponding to the third 3D organ shape model 116. In addition, the deformation space 121 generated by the deformation space generation unit 120 may further include a plurality of pieces of interpolation data obtained by performing an interpolation operation on the first projection data 122, the second projection data 123, and the third projection data 124.

The real-time medical image acquisition unit 122 acquires a real-time medical image 123 of the organ of the subject. The feature point extraction unit 124 extracts at least one feature point 1251 from the real-time medical image 125 of the organ of the subject.

The neutral model generation unit 126 generates a neutral model 127 of the real-time medical image 125 by matching the at least one feature point 1251 extracted by the feature point extraction unit 124 to one of the 3D organ shape models of the organ of the subject generated by the 3D organ shape model generation unit 110.

The 3D organ deformation model estimation unit 130 estimates a 3D organ deformation model 131 of the organ of the subject based on the neutral model 127 and the deformation space 121. For example, the 3D organ deformation model estimation unit 130 projects the neutral model 127 onto the deformation space 121, detects a point 128 corresponding to the neutral model 127 in the deformation space 121, and estimates a 3D organ shape model corresponding to the corresponding point 128 as the 3D organ deformation model 131.

Therefore, if the organ deformation model estimation apparatus 100 receives the real-time medical image 123, the organ deformation model estimation apparatus 100 may quickly and accurately estimate the 3D organ deformation model 131 corresponding to the real-time medical image 123.

Figure 4:
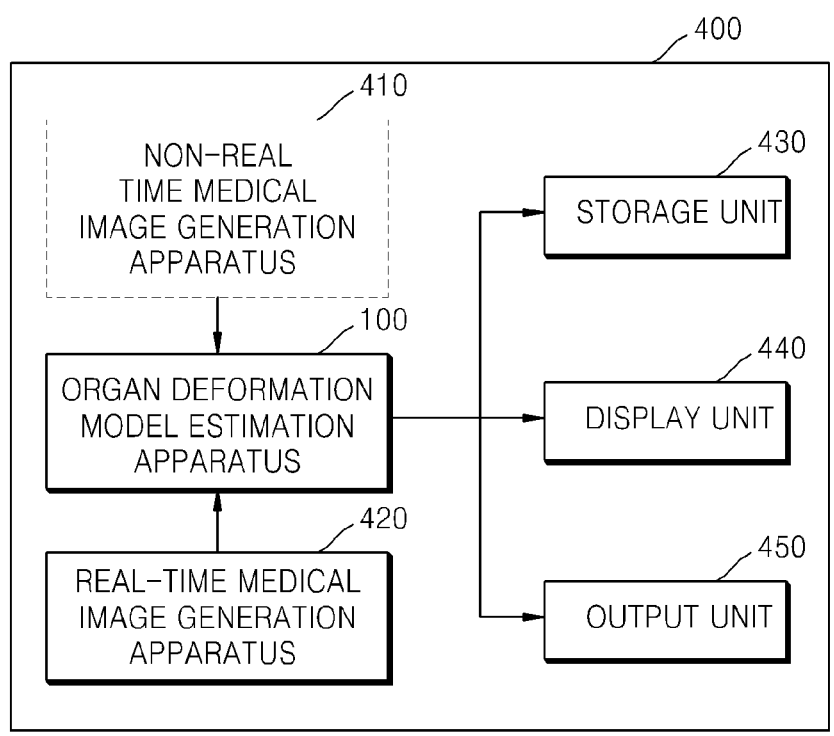
FIG. 4 is a block diagram of an example of a medical image system.

FIG. 4 is a block diagram of an example of a medical image system 400. Referring to FIG. 4, the medical image system 400 includes the organ deformation model estimation apparatus 100, a non-real time medical image generation apparatus 410, a real-time medical image generation apparatus 420, a storage unit 430, a display unit 440, and an output unit 450.

Only elements related to this example are shown in the medical image system 400 of FIG. 4. Accordingly, it will be apparent to one of ordinary skill in the art that other general-purpose elements may also be included in the medical image system 400.

The organ deformation model estimation apparatus 100 of FIG. 4 corresponds to the organ deformation model estimation apparatus 100 of FIGS. 1 and 2. Accordingly, the description with reference to FIGS. 1 and 2 is also applicable to the organ deformation model estimation apparatus 100 of FIG. 4, and thus redundant descriptions will not be repeated below.

The organ deformation model estimation apparatus 100 estimates a 3D organ deformation model of a real-time medical image of a subject based on a deformation space generated based on at least one 3D organ shape model representing a deformation state of an organ of the subject and prior knowledge regarding the organ.

The non-real time medical image generation apparatus 410 acquires at least one non-real time medical image representing a deformation state of the organ of the subject. The non-real time medical image may be a CT image, an MRI image, or any other type of medical image known to one of ordinary skill in the art. Thus, the non-real time medical image generation apparatus 410 may be a CT image generation apparatus, an MRI image generation apparatus, or any other medical image generation apparatus known to one of ordinary skill in the art Furthermore, although the non-real time medical image generation apparatus 410 of FIG. 4 is included in the medical image system 400 in the example in FIG. 4, the non-real time medical image generation apparatus 410 may be excluded from the medical image system 400 depending on an environment where the non-real time medical image generation apparatus 410 is used.

The real-time medical image generation apparatus 420 acquires a real-time medical image of the organ of the subject. The real-time medical image may be an ultrasonic image or any other medical image that can be generated in real time known to one of ordinary skill in the art, and thus the real-time medical image generation apparatus 420 may be an ultrasonic image generation apparatus, or any other medical image generation apparatus capable of generating a medical image in real time known to one of ordinary skill in the art The storage unit 430 stores the 3D organ deformation model estimated by the organ deformation model estimation apparatus 100.

The display unit 440 displays the 3D organ deformation model estimated by the organ deformation model estimation apparatus 100.

The output unit 450 outputs the 3D organ deformation model estimated by the organ deformation model estimation apparatus 100 to an external apparatus over a wired or wireless network or through a wired serial connection, and may also transmit and receive data to and from the external apparatus over the wired or wireless network or through the wired serial connection. Examples of a network include the Internet, a local area network (LAN), a wireless LAN, a wide area network (WAN), and a personal area network (PAN), and any other network known to one of ordinary skill in the art that is capable of transmitting and receiving information.

Although the example in FIG. 5 includes both the display unit 440 and the output unit 450, in other examples the display unit 440 may be omitted and only the output unit 450 included, or the output unit 450 may be omitted and only the display unit 440 included.

Also, although not shown in the example in FIG. 4, an image reading and searching function may be provided in the storage unit 430 and the output unit 450 to integrate the storage unit 430 and the output unit 450 as a picture archiving and communication system (PACS).

Therefore, the medical image system 400 may store, display, and output the 3D organ deformation model that is estimated quickly and accurately from the real-time medical image of the organ of the subject.

FIG. 5 is a flowchart illustrating an example of a method of estimating an organ deformation model. Referring to FIG. 5, the method includes operations performed in sequence by the organ deformation model estimation apparatus 100 of FIGS. 1 and 2 or the medical image system 400 of FIG. 4. Thus, the description regarding the organ deformation model estimation apparatus 100 of FIGS. 1 and 2 and the description of the medical image system 400 of FIG. 4 are also applicable to the method of FIG. 5, even if it is omitted for conciseness.

In operation 501, the 3D organ shape model generation unit 110 generates at least one 3D organ shape model of an organ of a subject based on at least one non-real time medical image representing a deformation state of the organ of the subject.

In operation 502, the deformation space generation unit 120 generates a deformation space for the organ of the subject based on the at least one 3D organ shape model generated in operation 501 and prior knowledge regarding the organ.

In operation 503, the 3D organ deformation model estimation unit 130 estimates a 3D organ deformation model of the organ of the subject based on a real-time medical image of the organ of the subject and the deformation space generated in operation 502.

According to the method of estimating the organ deformation model, when image-guided surgery is performed, even if a location and a shape of the organ continuously vary over time due to respiration or a heartbeat, a lesion may be treated by tracking an affected area.

Furthermore, since a deformation space personalized to the organ of the subject is generated, even if a heterogeneous medical image (i.e., one of various kinds of medical images) is input as the real-time medical image, the 3D organ deformation model of the organ may be accurately estimated. The 3D organ deformation model may be estimated based on a limited real-time medical image (i.e., a real-time medical image having a limited resolution and a limited field of view), and thus the method may be used to diagnose, perform surgery on, treat, and prevent a disease of a patient.

In addition, the organ deformation model estimation apparatus 100 may be used to accurately estimate a real-time 3D organ deformation result of the organ of the patient for navigation or during surgery on an organ of the patient that has a non-rigid characteristic.

Furthermore, when a limited real-time medical image of a treatment area of an organ of a patient like that used in image-guided surgery is provided to a surgeon, since the limited real-time medical image of the treatment area has a limited resolution and a limited field of view, the surgeon cannot view the treatment area clearly, so the organ deformation model estimation apparatus 100 may be used to configure the organ of the patient as a 3D organ deformation model and provide the 3D organ deformation model to the surgeon, thereby enhancing accuracy of the surgery.

As described in the various examples above, a 3D organ deformation model reflecting a deformation result of an organ of a human body may be accurately estimated in real time based on a real-time medical image of the organ of the human body.

The organ deformation model estimation apparatus 100, the non-real time medical image acquisition unit 105, the 3D organ shape model generation unit 110, the prior knowledge database 115, the deformation space generation unit 120, the real-time medical image acquisition unit 122, the feature point extraction unit 124, the neutral model generation unit 126, and the 3D organ deformation model estimation unit 130 described above may be implemented using one or more hardware components, one or more software components, or a combination of one or more hardware components and one or more software components.

A hardware component may be, for example, a physical device that physically performs one or more operations, but is not limited thereto. Examples of hardware components include amplifiers, low-pass filters, high-pass filters, band-pass filters, analog-to-digital converters, digital-to-analog converters, registers, arithmetic units, functional units, memory devices, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of estimating an organ deformation model, the method comprising:
    generating at least one 3D organ shape model of an organ of a subject based on at least one non-real time medical image representing a deformation state of the organ of the subject;
    generating a deformation space for the organ of the subject based on the at least one 3D organ shape model and prior knowledge regarding the organ; and
    estimating a 3D organ deformation model of the organ of the subject based on a real-time medical image of the organ of the subject and the deformation space.

2. The method of claim 1, wherein the generating of the at least one 3D organ shape model comprises generating at least two 3D organ shape models all having a same topology.

3. The method of claim 2, wherein connections between vertexes constituting the at least two 3D organ shape models all having the same topology and edges connecting the vertexes are the same in each of the at least two 3D organ shape models all having the same topology.

4. The method of claim 1, wherein the generating of the deformation space comprises generating the deformation space by performing an interpolation operation on a deformation space defined based on the at least one 3D organ shape model using the prior knowledge as a limitation condition.

5. The method of claim 1, wherein the estimating of the 3D organ deformation model comprises estimating the 3D organ deformation model of the organ of the subject by matching the real-time medical image of the organ of the subject to the deformation space.

6. The method of claim 1, further comprising extracting at least one feature point from the real-time medical image of the organ of the subject;
    wherein the estimating of the 3D organ deformation model comprises estimating the 3D organ deformation model based on the at least one feature point and the deformation space.

7. The method of claim 6, wherein the estimating of the 3D organ deformation model further comprises:
    detecting a 3D organ shape model satisfying the at least one feature point from the deformation space; and
    applying the at least one feature point to the detected 3D organ shape model to estimate the 3D organ deformation model.

8. The method of claim 1, further comprising:
    extracting at least one feature point from the real-time medical image of the organ of the subject; and
    generating a neutral model of the real-time medical image by matching the at least one feature point to one 3D organ shape model of the at least one 3D organ shape model;
    wherein the estimating of the 3D organ deformation model comprises estimating the 3D organ deformation model based on the neutral model and the deformation space.

9. The method of claim 8, wherein the generating of the neutral model comprises:
    detecting at least one point corresponding to the at least one feature point in the one 3D shape model of the at least one 3D organ shape model; and
    deforming the detected at least one point based on the at least one feature point to generate the neutral model.

10. The method of claim 8, wherein the estimating of the 3D organ deformation model further comprises projecting the neutral model onto the deformation space to estimate the 3D organ deformation model.

11. A non-transitory computer-readable storage medium storing a program for controlling a computer to perform the method of claim 1.

12. An apparatus for estimating an organ deformation model, the apparatus comprising:
- a 3D organ shape model generation unit configured to generate at least one 3D organ shape model of an organ of a subject based on at least one non-real time medical image representing a deformation state of the organ of the subject;
- a deformation space generation unit configured to generate a deformation space for the organ of the subject based on the at least one 3D organ shape model and prior knowledge regarding the organ; and
- a 3D organ deformation model estimation unit configured to estimate a 3D organ deformation model of the organ of the subject based on a real-time medical image of the organ of the subject and the deformation space.

13. The apparatus of claim 12, wherein the 3D organ shape model generation unit is further configured to generate at least two 3D organ shape models all having a same topology.

14. The apparatus of claim 12, wherein the deformation space generation unit is further configured to generate the deformation space by performing an interpolation operation on a deformation space defined based on the at least one 3D organ shape model using the prior knowledge as a limitation condition.

15. The apparatus of claim 12, wherein the 3D organ deformation model estimation unit is further configured to estimate the 3D organ deformation model of the organ of the subject by matching the real-time medical image of the organ of the subject to the deformation space.

16. The apparatus of claim 12, further comprising a feature point extraction unit configured to extract at least one feature point from the real-time medical image of the organ of the subject;
- wherein the 3D organ deformation model estimation unit is further configured to estimate the 3D organ deformation model based on the at least one feature point and the deformation space.

17. The apparatus of claim 12, further comprising:
- a feature point extraction unit configured to extract at least one feature point from the real-time medical image of the organ of the subject; and
- a neutral model generation unit configured to generate a neutral model of the real-time medical image by matching the at least one feature point to one 3D organ shape model of the at least one 3D organ shape model;
- wherein the 3D organ deformation model estimation unit is further configured to estimate the 3D organ deformation model based on the neutral model and the deformation space.

18. The apparatus of claim 17, wherein the 3D organ deformation model estimation unit is further configured to project the neutral model onto the deformation space to estimate the 3D organ deformation model.

\* \* \* \* \*